ized Patent (12) United States Patent
Lawrence (10) Patent No.: US 9,213,750 B2
(45) Date of Patent: Dec. 15, 2015

(54) SYSTEM FOR AND METHOD FOR DATA REFLOW IN A STATELESS SYSTEM

(71) Applicant: Verizon Patent and Licensing Inc., Basking Ridge, NJ (US)

(72) Inventor: Craig L. Lawrence, Seminole, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 191 days.

(21) Appl. No.: 14/073,071

(22) Filed: Nov. 6, 2013

(65) Prior Publication Data

US 2015/0127977 A1  May 7, 2015

(51) Int. Cl.
*G06F 11/00*  (2006.01)
*G06F 17/30*  (2006.01)
*G06F 11/14*  (2006.01)

(52) U.S. Cl.
CPC ...... *G06F 17/30575* (2013.01); *G06F 11/1458* (2013.01)

(58) Field of Classification Search
CPC ............ G06F 11/1443; G06F 11/1402; G06F 11/0793; G06F 11/1407; G06F 17/30575; G06F 11/0709; G06F 11/1474; G06F 11/1471; G06F 17/30368; G06F 11/1458; G06F 17/30227; G06F 2201/84; G06F 11/1446; G06F 11/1469; G06F 9/466; H04L 1/08; Y10S 707/99953
See application file for complete search history.

(56) References Cited

U.S. PATENT DOCUMENTS

| | | | |
|---|---|---|---|
| 9,021,303 B1* | 4/2015 | DeSouter et al. | 714/20 |
| 2008/0301286 A1* | 12/2008 | Little | 709/224 |
| 2012/0042314 A1* | 2/2012 | Aydin et al. | 718/101 |
| 2014/0297595 A1* | 10/2014 | Larson et al. | 707/648 |

* cited by examiner

*Primary Examiner* — Jason Bryan (57) ABSTRACT

Embodiments provide systems and methods having an engine that gives stateless applications attributes of a 'stateful' process. To accomplish this end, a 'snapshot' of a transaction at a given point is taken and persisted until receiving confirmation that the transaction is completed. The snapshot may be a snapshot of data flowing in a stateless messaging system. The snapshot is maintained until confirmation that all intended recipients to which the transaction relates to have completed the steps they need to for the given transaction. The snapshot may be formed into a message and reflowed to an intended recipient to ensure that the recipient receives the message in the event that the initial delivery is unsuccessful.

20 Claims, 3 Drawing Sheets

SYSTEM FOR AND METHOD FOR DATA REFLOW IN A STATELESS SYSTEM

BACKGROUND INFORMATION

Many computer applications operate in a stateless manner, meaning information is not saved with respect to the process or actions taken. In these stateless applications, information is lost if an exchange of data is unsuccessful. For example, in a stateless messaging environment, a message is desired to be transmitted to a number of recipients. If the transmission is unsuccessful to one of the recipients (e.g., the particular recipient's server has a communications fault, is down for maintenance, or has reached capacity), the message will not be delivered to that recipient. While a record indicating the fault occurred can be recorded, there is no persistence of the data that was processed. Thus, if a resend is required, the message could be resent from the original source system in its entirety. This would result in processing to all of the recipients, resulting in duplicative messages and wasted bandwidth.

These and other deficiencies exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

According to exemplary embodiments, systems and methods may provide an engine that gives stateless applications attributes of a 'stateful' process. This may ensure that steps already performed of a given process are not lost if the process terminates before completion. To accomplish this, a 'snapshot' of a transaction at a given point in a process is taken and persisted until receiving confirmation that the transaction completed. The snapshot may be a snapshot of data flowing through the process, such as a business document or information included in a message, for example. The snapshot is maintained until confirmation that all intended recipients to which the transaction relates to have completed the steps they need to for the given transaction.

Exemplary embodiments, to accomplish the above, split the stateless proxy services; insert the snapshot at the split point so that the transaction can resume based on the snapshot rather than having to recreate the transaction from its beginning. The snapshot is assigned a transaction key or identifier to associate/index the transaction with the corresponding snapshot. The key/identifier provides a way for retrieving the snapshot and to insert it at the split point (that is, where the transaction failed). This may be known as a defined endpoint. Exemplary embodiments may use a URL at the failed transaction as the return address to send the snapshot transaction to. This URL may be associated with the key/identifier to enable the snapshot to be inserted at the proper point in the process. This is necessary since the snapshot is taken prior to any failure or termination of the process occurring. Once the snapshot is resent or used, a flag or other identifier may be set by the engine to indicate the completion of the transaction.

Exemplary embodiments may combine automated features with manual intervention. For example, upon a failure in the process being observed, such as a message not being delivered, an operator may be notified. The operator may investigate the failure and track its correction. Upon indication of the system being fully operational, the operator may initiate the insertion of the snapshot to resume the process.

Each snapshot may be stored in a database or other suitable data repository. The snapshot may be stored in eXtensible Markup Language (XML) format. It should be appreciated that other formats are possible. The snapshot format may match that of the incoming message or document format. The snapshots may be stored for a period of time before being purged or deleted. For example, the snapshots may be deleted after one month or after the process is completed, that is, the snapshot is no longer needed. The database of snapshots may be used to generate reports and other operational data. The database may have processes in place to audit activities relating to the snapshots for reporting.

The engine according to exemplary embodiments may serve as middleware residing between two sets of systems, both of which send and receive data. The engine may provide functionality as described above to give stateless processes a stateful condition. In doing so, the engine may constantly operate to ensure that data flows between the systems. One system may transmit data that is destined for another system. The transmitting system may be operating in an asynchronous manner. The engine may interact with, and control the operation of, a service bus and service oriented architecture. The engine may run in the background. The service bus and the service orientated architecture, in some embodiments, may be commercial off-the-shelf applications which the engine may be a separately coded application that is configured to interact with the commercial applications to allow the exemplary embodiments to operate.

In the following figures, while a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized.

The description below describes network elements, computers, and components of exemplary embodiments. The elements depicted may be modules of a single larger element. Each of these elements may also include one or more modules. As used herein, the term "module" may be understood to refer to computer implemented executable software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Moreover, the figures illustrate various components (e.g., servers, computers, etc.) separately. The functions described as being performed at various components may be performed at other components, and the various components may be combined or separated. Other modifications also may be made.

Exemplary embodiments may include software that is installed on computer hardware to allow the execution of instructions to implement the methods described herein. The software may be tangibly embodied in one or more non-transitory physical media, such as, but not limited to, a compact disc ("CD"), a digital versatile disc ("DVD"), a floppy disk, a hard drive, read only memory ("ROM"), random access memory ("RAM"), and other physical media capable of storing software, or combinations of different media.

Figure 1A:
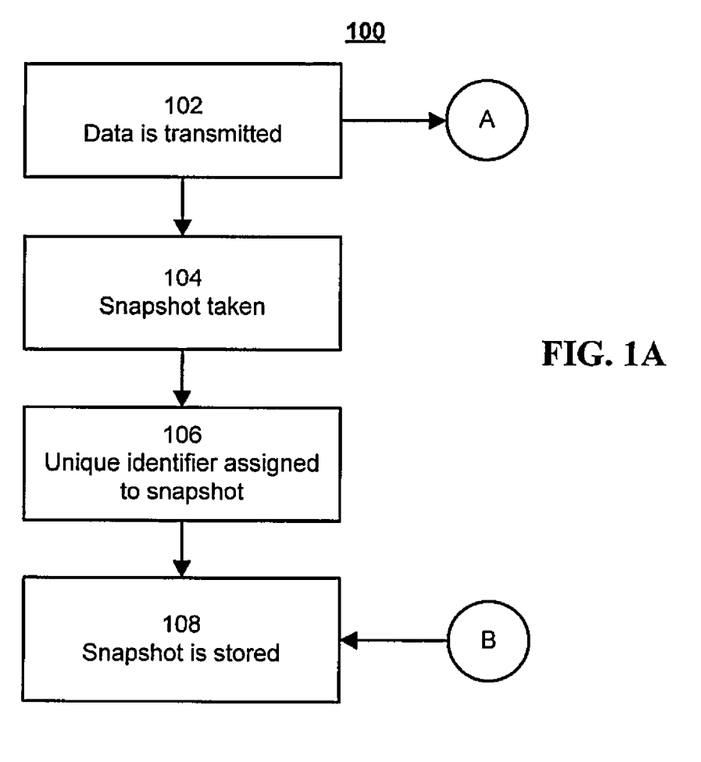
FIG. 1A depicts a method for obtaining a snapshot of transmitted data in stateless system according to exemplary embodiments.
Figure 1B:
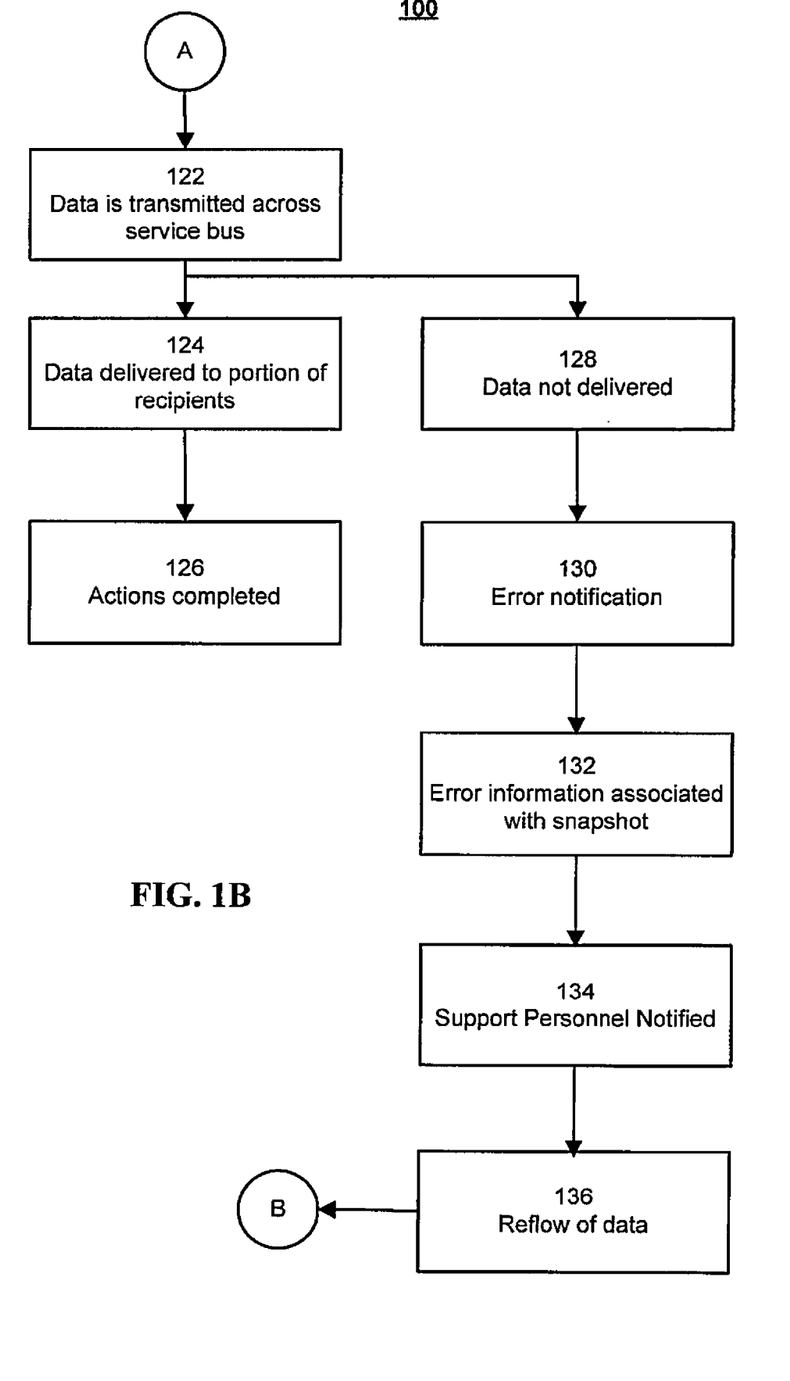
FIG. 1B depicts a method for data reflow in stateless system according to exemplary embodiments.

FIGS. 1A and 1B are methods for data reflow according to exemplary embodiments. Exemplary method 100 is provided by way of example, as there are a variety of ways to carry out the methods disclosed herein. The method 100 as shown in FIGS. 1A and 1B may be executed or otherwise performed by one or a combination of various systems, such as a computer implemented system. Each block shown in FIGS. 1A and 1B represents one or more processes, methods, and/or subroutines carried out in the exemplary method 100. Each block may have an associated processing machine or the blocks depicted may be carried out through one processor machine.

At block 102, data is transmitted by a system. The data may be asynchronously transmitted. Once transmitted, the data may enter a service bus, which is stateless, through which the engine according to exemplary embodiments acts. The service bus may start a thread for the data transmission. The data may be acknowledged by the bus to the system. For example, the bus may acknowledge the receipt of the data. The data may be in any of a variety of formats and may have a variety of content contained therein. For example, the data may be a Simple Access Object Protocol (SOAP) message that is being sent to a number of recipients. It should be appreciated that while a SOAP message is used as an example herein, other forms of data are possible and within the scope of exemplary embodiments. For example, the data may be a business document or a transaction.

At block 104, a snapshot is taken of the data. The snapshot may be taken following the data entering the bus. The snapshot may be taken electronically. The snapshot may be taken automatically by the service bus and/or the engine. For example, the snapshot may be taken of the SOAP message. The snapshot may be in XML format. It should be appreciated that other formats may be used. In some embodiments, the snapshot format may match the format of the message. In the instant example, XML is used since the original message was a SOAP message.

At block 106, a unique identifier is assigned to the snapshot. The identifier may be a unique key or other identifier to provide a reference to the snapshot. The unique identifier may be assigned by the service bus.

At block 108, the snapshot is stored. The snapshot may be input into a service oriented architecture (SOA) and stored in a database or data repository. The snapshot may be indexed or keyed by the unique identifier. A service name may be added.

Turning to FIG. 1B, at block 122, the data is transmitted across the service bus as part of the thread. For example, the SOAP message may be transmitted across the service bus to its intended recipients. Block 122 may occur after block 102 and may occur in parallel with the steps of the method 100 described above.

At block 124, the data is delivered to at least a portion of the intended recipients. For example, the SOAP message is delivered to some of the intended recipients. Each recipient may generate an acknowledgement following receipt of the SOAP message.

At block 126, the actions are completed for the delivered data. The original thread is terminated at this point by the service bus unless block 128 occurs, which may not occur in all instances.

At block 128, the data is not delivered to or received by at least one recipient. For example, the recipient's communication server may be down, such as for a hardware/software failure or down for maintenance, the server may have reached capacity, or is faulted causing the message to be rejected. The service bus may detect this fault. For example, the service bus may fail to receive a delivery acknowledgement for the SOAP message or the service bus may receive an industry standard error message indicating the target server is in an error state At block 130, an error notification is generated. The error notification may be generated by the service bus upon delivery failure and sent to the SOA engine. The service bus may terminate the thread.

At block 132, the error notification is associated with a snapshot. The error notification may be logged and stored in the database by the SOA. The error notification may be associated with the snapshot based on the identifier and the service name. The error notification may include information as to where the fault or error occurred in the process. For example, the error notification may include the Uniform Resource Locator (URL) and server name to which the data was being sent. This information may be appended to the snapshot of the message. In the case of an XML snapshot, the information may be added as a header for a SOAP message. The information may be required to define where the snapshot is required to be sent since the snapshot was taken following the initial data transmission before the error occurred. Thus, the snapshot may only contain the originating data and intended recipient information. The snapshot, as originally stored, therefore does not contain information regarding which recipient failed to receive the data.

At block 134, the error notification, along with the snapshot identifier, is sent to one or more support personnel. The support personnel may review the error and determine the status of the recipient's system that did not receive the data. It should be appreciated that this step may be automated, or in some embodiments, be optional. It should be appreciated that in some embodiments, the error notification may be sent following the error and the snapshot information may follow separately to the support personnel. In some embodiments, this process may be automated. In other embodiments, this step may be omitted. It should also be appreciated that the predication of an error is not the sole embodiment to resend a message. Any message that was stored as a snapshot, if the unique key be known, may be resent using this process.

At block 136, the data is reflowed to recipient. The data may be retransmitted or reflowed to the recipient. This may be done following a determination that the fault or error has been corrected so that the recipient is capable of receiving the data. To reflow the data, the snapshot may be retransmitted from the SOA to the service bus and a new thread started. The snapshot may be found in the database where it was stored at block 108 and retrieved. The engine may dynamically rebuild the initial message based on the snapshot and the stored information. The reflow may be initiated by the support personnel. In some embodiments, the reflow may be automatically initiated. In still other embodiments, the reflow may be initiated remotely from a mobile device, Short Message Service (SMS) device, or other such messaging protocols. The process returns to block 122 as the reflowed message enters the service bus for transmission to the indicated recipient.

Figure 2:
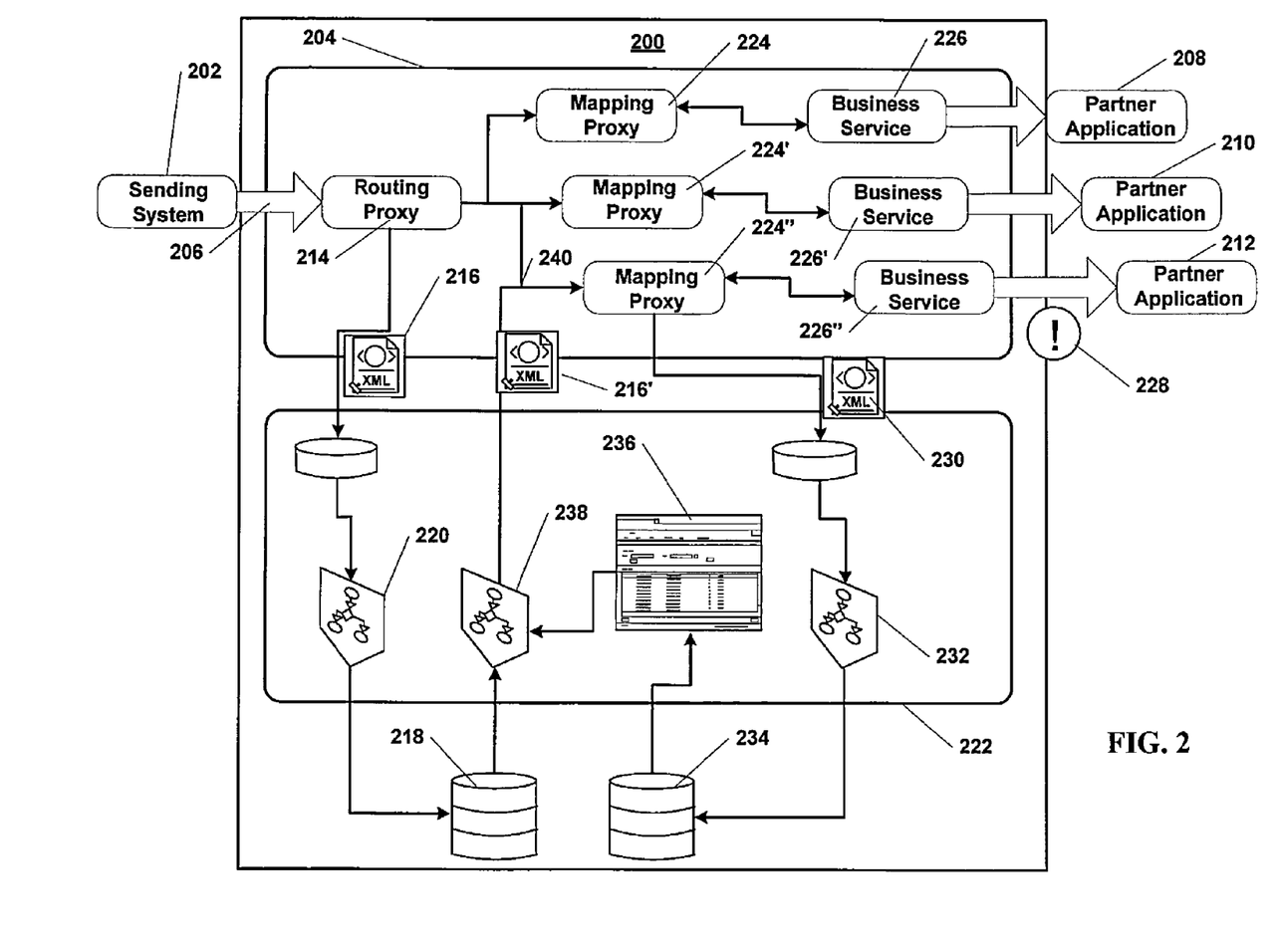
FIG. 2 depicts a system for data reflow according to exemplary embodiments.

FIG. 2 depicts a system according to an exemplary embodiment. The system 200 may have a number of components. The method 100 may be implemented on the system 200.

The system 200 may have sending system 202. The sending system 202 may transmit an asynchronous message into a service bus 204.

In some embodiments, the sending system 202 may be a computing device that has one or more processors for recording, transmitting, receiving, and storing data, as well as computer memory.

The sending system 202 may be the originator of data, that is, the system may transmit data through the system 200 for receipt by one or more recipients. For example, the asynchronous message, depicted at 206 as entering the service bus 204, may be intended for a series of recipients, such as partner applications 208, 210, and 212. It should be appreciated that while three recipients are depicted, more or less recipients are possible.

It should further be appreciated that the sending system 202 and partner applications 208, 210, and 22 may represent more than one application each.

The asynchronous message may contain any type of data. For example, the data may be one or more messages or documents. The data may relate to a transaction. The data may flow into and through the service bus 204 as part of the system 200. The service bus 204 may operate in a stateless manner. The service bus 204 may acknowledge the transmission of the message to the application 202. The service bus 204 may assign the message a unique ID at 206 upon entry into the service bus. The service bus may create a thread for the transmission of the message.

At the routing proxy 214, a snapshot 216 may be taken of the message. The snapshot 216 may be in an XML format as depicted. It should be appreciated that this is exemplary and non-limiting as other formats could be used. The snapshot 216 may be put in XML format or the snapshot 216 may be in a format matching the format of the original message. The point 214 may be at the start (or endpoint) of the service bus 204. Thus, the snapshot 216 may be taken as the message enters the service bus 204. As depicted, a routing proxy may take the snapshot 216.

The snapshot 216 may be transmitted to a SOA 222. The snapshot 216 may be transmitted with the unique ID and a service name from the service bus 204. The snapshot may be passed through an audit service at 220. The audit service may process the snapshot 216 and store the snapshot 216 in a database 218. The database 218 may be referred to as audit tables.

For example, the snapshot 216 may be formatted as follows including the unique ID for insertion in the database 218 for storage:

```
<DELVRY07 tid="9FA1161242C852765CF80022" xmlns="urn:sap-com:document:sap:idoc">
  <IDOC BEGIN="1">
    <E1EDL20 SEGMENT="1">
      <VBELN>0081207998</VBELN>
      <VSTEL>BBBB<VSTEL>
      <VKORG>1274</VKORG>
      <PODAT>20131103</PODAT>
```

-continued

```
      <POTIM>092559</POTIM>
      <LOC_SEQ/>
      <HOLD/>
      <MAX_ERR_TYPE/>
      <LE_SCENARIO/>
      <RECIPIENT_CREATE/>
      <E1EDL22 SEGMENT="1">
        <VSTEL_BEZ>PA STEW</VSTEL_BEZ>
        <VKORG_BEZ>Purchasing</VKORG_BEZ>
        <VSBED_BEZ>Standard</VSBED_BEZ>
        <TRATY_BEZ/>
      <E1EDL22>
      <E1EDL21 SEGMENT="1">
        <LFART>NLCC</LFART>
          <E1EDL23 SEGMENT="1">
          <LFART_BEZ>Replen.Cross-Company</LFART_BEZ>
          <TRAGR_BEZ>On pallets</TRAGR_BEZ>
        </E1EDL23>
      </E1EDL21>
      <E1EDL18 SEGMENT="1">
        <QUALF>ORI</QUALF>
        <PARAM/>
      </E1EDL18>
      <E1ADRM1 SEGMENT="1">
        <PARTNER_Q>AG</PARTNER_Q>
        <ADDRESS_T/>
        <PARTNER_ID>PLNT1230</PARTNER_ID>
        <JURISDIC>3101316600</JURISDIC>
        <LANGUAGE/>
        <FORMOFADDR/>
        <NAME1>VOL DEFAULT LOCATION</NAME1>
        <NAME2>ONLINE LLC</NAME2>
        <COUNTRY1>US</COUNTRY1>
        <COUNTRY2/>
        <REGION>NJ</REGION>
        <COUNTY_COD/>
        <COUNTY_TXT/>
        <TZCODE/>
        <TZDESC/>
      <E1ADRM1>
      <E1EDL24 SEGMENT="1">
        <POSNR>000010</POSNR>
        <MATNR>11257117</MATNR>
        <MATWA/>
        <ARKTX>VMS1100/3086/010/010</ARKTX>
        <MATKL>300000000</MATKL>
        <WERKS>BBBB</WERKS>
        <LGORT>VNEW</LGORT>
        <LFIMG>1.000</LFIMG>
        <VRKME>EA</VRKME>
        <LGMNG>1.000</LGMNG>
        <MEINS>EA</MEINS>
        <NTGEW>0.000</NTGEW>
        <BRGEW>0.000</BRGEW>
        <GEWEI>KG</GEWEI>
        <VOLUM>0.000</VOLUM>
        <LADGR>0001</LADGR>
        <TRAGR>0001</TRAGR>
        <VKBUR/>
        <VKGRP/>
        <VTWEG>01</VTWEG>
        <SPART>00</SPART>
        <GRKOR>000</GRKOR>
        <ZUDAT/>
        <VFDAT>00000000</VFDAT>
        <RMA_NUMBER/>
        <RMA_COMPLETE/>
        <EXPIRY_DATE_EXT>0</EXPIRY_DATE_EXT>
        <VGBEL>8000000000</VGBEL>
        <VGPOS>000010</VGPOS>
        <FOLLOW_UP_CODE/>
        <ORMNG>   1.000</ORMNG>
        <COMPL/>
        <HOLD/>
        <MAX_ERR_TYPE/>
        <LICHN/>
        <RECIPIENT_CREATE/>
        <EXPIRY_DATE_EXT_B>0</EXPIRY_DATE_EXT_B>
        <E1EDL26 SEGMENT="1">
```

-continued

```
        <PSTYV>NLC</PSTYV>
        <MATKL>300000000</MATKL>
        <PRODH/>
        <UMVKZ>1</UMVKZ>
        <UMVKN>1</UMVKN>
        <KZTLF/>
        <UEBTK/>
        <UEBTO>0.0</UEBTO>
        <UNTTO>0.0</UNTTO>
        <LIFEXPOS2/>
        <CQU_SA/>
        <CQU_SA_UNIT/>
        <CQU_ITQS/>
        <CQU_ITQS_UNIT/>
        <VBUMH_BME/>
        <E1EDL27 SEGMENT="1">
            <PSTYV_BEZ>InterCo Stock Tr.Itm</PSTYV_BEZ>
            <MATKL_BEZ>Set top box</MATKL_BEZ>
            <PRODH_BEZ/>
            <WERKS_BEZ>PA CS-1</WERKS_BEZ>
        </E1EDL27>
      </E1EDL26>
      <E1EDL43 SEGMENT="1">
          <QUALF>V</QUALF>
          <BELNR>8000000000</BELNR>
          <POSNR>000010</POSNR>
          <DATUM>20131103</DATUM>
      </E1EDL43>
    </E1EDL24>
  </E1EDL20>
 </IDOC>
</DELVRY07>
```

As shown by the above XML code, the payload of the message that may be saved to the database 218 has a unique ID 3a10e223-5702-4682-92eb-b120f83f2442. It should be appreciated that the preceding example is meant to be exemplary and non-limiting, as a variety of unique ID formats may be used.

The database 218 may be any type of database, such as an Oracle database, a Microsoft SQL Server database, a DB2 database, a MySQL database, a Sybase database, an object oriented database, a hierarchical database, or other database. The data storage may utilize flat file structures for storage of data.

The snapshot 216 may be stored in the database 218 keyed by the unique ID assigned.

In some embodiments, the message may be successfully transmitted to each partner application. In passing through the service bus 204, the message may pass through a set of mapping proxies or mapping services 224, 224', and 224" and a set of business services 226, 226', and 226". As depicted in the system 200, the message, following passing through the routing proxy at 214, may be duplicated and sent through a mapping proxy and a business service for each partner application destination. Upon successful transmission, the service bus 204 may terminate the thread for the particular message. The service bus 204 may notify the SOA 222 of the successful transmission.

However, according to exemplary embodiments, the message may not successfully reach one or more of the partner applications 208, 210, and/or 212. A fault 228 may occur. For example, one of the partner applications, such as 212 may be unreachable for reasons described above, for example. In this example, a connection error may be generated and sent back to the mapping proxy 224" corresponding to the particular business service (226") for the respective partner application.

A notification 230 may be sent to the SOA 222. The mapping proxy 224 may send the error notification 230 along with the service name and meta-data to the SOA 222. The service bus 204 may terminate the thread for the particular message. The error notification 230 may be sent to a fault service 232.

The notification 230 may be received, processed, and may be stored in an error table database 234. The notification 230 may contain information regarding the fault 228. The information may include a server name and/or URL as to where the fault 228 occurred. This information may be associated with a particular snapshot, such as the snapshot 216.

For example, the notification 230 may be an error message formatted as follows:

```
<input Variable>
    <part name="payload">
        <ns0:process>
            <ns0:correlationID>3a10e223-5702-4682-92eb-b120f83f2442</ns0:correlationID>
            <ns0:serviceName>L_Mapping_Proxy_Service_Name</ns0:serviceName>
            <ns0:osbFaultTime>2013-10-17T05:33:43.178-04:00</ns0:osbFaultTime>
            <ns0:faultDescription>
                <ctx:fault xmlns:ctx="http://www.bea.com/wli/sb/context"><ctx:errorCode>BEA-100000</ctx:errorCode><ctx:reason>Connection Timeout</ctx:path></ctx:location></ctx:fault>
            </ns0:faultDescription>
            <ns0:destination>SomeParmer</ns0:destination>
            <ns0:rcflowUrl>/Project_Name/Proxy/L_Mapping_Proxy_Service_Name</ns0:reflowUrl>
            <ns0:faultCallType>RCWR</ns0:faultCallType>
        </ns0:process>
    </part>
</inputVariable>
```

As can be seen, the error message may contain a unique ID, the service name, time, error message, and the URL needed for service that failed. This example is meant to be exemplary and non-limiting as a variety of error message formats may be used.

In some embodiments, the fault service 232 may process the notification 230 and transmit a further notification or alert to other systems or terminals within the system 200. This notification may be for system operators. For example, a support portal 236 may allow operators to view messages for reflow. A message may be selected and submitted to the reflow service 238 along with the meta-data for the reflow. In some embodiments, the message may be selected remotely and transmitted by methods the may include mobile application screens, SMS messages, or other such remote protocols.

For example, when the operator has selected a failed message for reflow, a message will be sent to the SOA 222 to invoke the reflow service 238. The message may contain the unique ID, the service name and the user ID for auditing. An exemplary message may be as follows:

```
<inputVariable>
<part name="payload">
<ns1:process>
        <ns1:ReflowRequest>
                <GUID>3a10e223-5702-4682-92eb-b120f83f2442
                </GUID>
                <ServiceName>L_Mapping_Proxy_Service_Name
                </ServiceName>
        </ns1:ReflowRequest>
        <UserId>1234567</UserId>
</ns1:process>
</part>
</inputVariable>
```

This example is meant to be exemplary and non-limiting as a variety of messages to invoke reflow may be used.

Either automatically or manually from the support portal 236, the snapshot 216 may be queued and retransmitted or reflowed using the reflow service 238 as the snapshot 216'. The snapshot 216 may be located using the unique key in the database 218.

The snapshot 216' may be the snapshot 216 with the information from the fault included as described above. The snapshot 216' may be a dynamic rebuild of the original data transmission. For example, the snapshot 216' may be built using the meta-data as a SOAP message with a payload including the original message. The snapshot 216' may be reinserted into the service bus data flow as depicted at 240 and a process restarted. Point 240 may be the point where there error occurred or upstream of the fault location. The snapshot retransmission or reflow may be performed following resolution of the fault 228 to prevent the fault from occurring again and preventing the message from reaching the partner application. The service bus 204 may create new thread for the reflow.

For example, the SOAP message for resend may be formatted as follows:

```
<soapnv:Envelope xmlns:soapenv="http://schemas.xmlsoap.org/soap/
envelope/"
xmlns:urn="urn:sap-com:document:sap:idoc">
    <soapenv:Header>
<cor:correlationId xmlns:cor="http://www.verizon.con/vsii/
correlationId">3a10e223-5702-
4682-92eb-b120f83f2442</cor:correlationId>
</soapenv:Header>
    <soapenv:Body>
        <DELVRY07 tid="9FA1161242C852765CF80022" xmlns="urn:sap-
com:document:sap:idoc">
        <IDOC BEGIN="1">
            <E1EDL20 SEGMENT="1">
                <VBELN>0081207998</VBELN>
                <VSTEL>BBBB<VSTEL>
                <VKORG>1274</VKORG>
                <PODAT>20131103</PODAT>
                <POTM>092559</POTIM>
                <LOC_SEQ/>
            <HOLD/>
            <MAX_ERR_TYPE/>
            <LE_SCENARIO/>
            <RECIPIENT_CREATE/>
            <E1EDL22 SEGMENT="1">
                <VSTEL_BEZ>PA STEW</VSTEL_BEZ>
                <VKORG_BEZ>Purchasing</VKORG_BEZ>
                <VSBED_BEZ>Standard</VSBED_BEZ>
```

-continued

```
                <TRATY_BEZ/>
            </E1EDL22>
        <E1EDL21 SEGMENT="1">
            <LFART>NLCC</LFART>
                <E1EDL23 SEGMENT="1">
                <LFART_BEZ>Replen.Cross-Company</LFART_BEZ>
                <TRAGR_BEZ>On pallets</TRAGR_BEZ>
            </E1EDL23>
        </E1EDL21>
        <E1EDL18 SEGMENT="1">
            <QUALF>ORI</QUALF>
            <PARAM/>
        </E1EDL18>
        <E1ADRM1 SEGMENT="1">
            <PARTNER_Q>AG</PARTNER_Q>
            <ADDRESS_T/>
            <PARTNER_ID>PLNT1230</PARTNER_ID>
            <JURISDIC>3101316600</JURISDIC>
            <LANGUAGE/>
            <FORMOFADDR/>
            <NAME1>VOL DEFAULT LOCATION</NAME1>
            <NAME2>ONLLNE LLC</NAME2>
            <COUNTRY1>US</COUNTRY1>
            <COUNTRY2/>
            <REGION>NJ</REGION>
            <COUNTY_COD/>
            <COUNTY_TXT/>
            <TZCODE/>
            <TZDESC/>
        </E1ADRM1>
        <E1EDL24 SEGMENT="1">
            <POSNR>000010</POSNR>
            <MATNR>11257117</MATNR>
            <MATWA/>
            <ARKTX>VMS1100/3086/010/010</ARKTX>
            <MATKL>300000000</MATKL>
            <WERKS>BBBB</WERKS>
            <LGORT>VNEW</LGORT>
            <LFIMG>1.000</LFIMG>
            <VRKME>EA<AVRKME>
            <LGMNG>1.000</LGMNG>
            <MEINS>EA</MEINS>
            <NTGEW>0.000</NTGEW>
            <BRGEW>0.000</BRGEW>
            <GEWEI>KG</GEWEI>
            <VOLUM>0.000</VOLUM>
            <LADGR>0001</LADGR>
            <TRAGR>0001</TRAGR>
                <VKBUR/>
                <VKGRP/>
                <VTWEG>01</VTWEG>
                <SPART>00</SPART>
                <GRKOR>000</GRKOR>
            <ZUDAT/>
            <VFDAT>00000000</VFDAT>
            <RMA_NUMBER/>
            <RMA_COMPLETE/>
            <EXPIRY_DATE_EXT>0</EXPIRY_DATE_EXT>
            <VGBEL>8000000000</VGBEL>
            <VGPOS>000010</VGPOS>
            <FOLLOW_UP_CODE/>
            <ORMNG>      1.000</ORMNG>
            <COMPL/>
            <HOLD/>
            <MAX_ERR_TYPE/>
            <LICHN/>
            <RECIPIENT_CREATE/>
            <EXPIRY_DATE_EXT_>0</EXPIRY_DATE_EXT_B>
            <E1EDL26 SEGMENT="1">
                <PSTYV>NLC</PSTYV>
                <MATKL>300000000</MATKL>
                <PRODH/>
                <UMVKZ>1</UMVKZ>
                <UMVKN>1</UMVKN>
                <KZTLF/>
                <UEBTK/>
                <UEBTO>0.0</UEBTO>
                <UNTTO>0.0</UNTTO>
                <LIFEXPOS2/>
```

```
        <CQU_SA/>
        <CQU_SA_UNIT/>
        <CQU_ITQS/>
        <CQU_ITQS_UNIT/>
        <VBUMG_BME/>
        <E1EDL27 SEGMENT="1">
            <PSTYV_BEZ>InterCo Stock Tr.Itm</PSTYV_BEZ>
            <MATKL_BEZ>Set top box</MATKL_BEZ>
            <PRODH_BEZ/>
            <WERKS_BEZ>PA CS-1</WERKS_BEZ>
        </E1EDL27>
      </E1EDL26>
      <E1EDL43 SEGMENT="1">
          <QUALF>V</QUALF>
          <BELNR>8000000000</BELNR>
          <POSNR>000010</POSNR>
          <DATUM>20131103</DATUM>
      </E1EDL43>
    </E1EDL24>
  </E1EDL20>
</IDOC>
</DELVRY07>
  </soapenv:Body>
</soapenv:Envelope>
```

The reflow service 238 can retrieve the original snapshot message using the unique ID. The reflow service 238 can then build a SOAP message using the retrieved XML. The service will be able to build the destination to send it by combining the URL that was saved and the server address configured for that server ([Configured Server URL]+[Saved URL for service that will be reflowed]; e.g., http://osb.server.com/Project_Name/Proxy/L_Mapping_Proxy_Service_Name). This example is meant to be exemplary and non-limiting, as a variety of formats may be used.

In some embodiments, the point 240, where the message is reinserted, may use a SOAP message and the Hypertext Transfer Protocol (HTTP). It should be appreciated that other message transfer technologies may be used such as Java Message Service (JMS), Representational State Transfer (REST), IBM Message Queue (MQ), or other protocols for transferring data to a service.

The system 200 may repeat the preceding process each time a fault occurs in data transmission.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A computer-implemented method, comprising:
receiving, from a computer application and by a stateless service bus of a device, a data transmission intended for one or more recipient systems;
producing a digital snapshot of contents of the data transmission by the stateless service bus of the device;
assigning, electronically, a unique identifier to the digital snapshot by the stateless service bus of the device;
forwarding, by the device, the digital snapshot along with the unique identifier to a service oriented architecture (SOA);
storing the digital snapshot in a database keyed to the unique identifier by the SOA;
receiving a notification of a failure of the data transmission to reach at least one of the one or more recipient systems, the notification comprising information pertaining to the failure including a uniform resource locator (URL) corresponding to an address associated with the failure;
appending the URL to the digital snapshot in the database; and
reflowing the digital snapshot with the appended URL to the stateless service bus for transmission to the at least one of the one or more recipient systems that failed to receive the data transmission.

2. The method of claim 1, wherein the data transmission comprises a Simple Object Access Protocol (SOAP) message.

3. The method of claim 1, wherein the digital snapshot is an eXtensible Markup Language (XML) document.

4. The method of claim 3, wherein reflowing the digital snapshot comprises:
creating a Simple Object Access Protocol (SOAP) message with the appended URL in header information and the XML document in a body.

5. The method of claim 1, wherein the notification is transmitted to an operator.

6. The method of claim 5, wherein the operator causes the reflowing of the digital snapshot.

7. A non-transitory computer-readable medium storing instructions, the instructions comprising:
one or more instructions which, when executed by a device, cause the device to:
receive, from a computer application and by a stateless service bus of the device, a data transmission intended for one or more recipient systems;
produce a digital snapshot of contents of the data transmission by the stateless service bus of the device;
assign, electronically, a unique identifier to the digital snapshot by the stateless service bus of the device;
forward the digital snapshot along with the unique identifier to a service oriented architecture (SOA);
store the digital snapshot in a database keyed to the unique identifier;
receive a notification of a failure of the data transmission to reach at least one of the one or more recipient systems,
the notification comprising information pertaining to the failure including a uniform resource locator (URL) corresponding to an address associated with the failure;
append the URL to the digital snapshot in the database; and
reflow the digital snapshot with the appended URL to the stateless service bus for transmission to the at least one of the one or more recipient systems that failed to receive the data transmission.

8. The non-transitory computer-readable medium of claim 7, wherein the data transmission comprises a Simple Object Access Protocol (SOAP) message.

9. The non-transitory computer-readable medium of claim 7, wherein the digital snapshot is an eXtensible Markup Language (XML) document.

10. The non-transitory computer-readable medium of claim 9, wherein the one or more instructions are further to reflow the digital snapshot include:
one or more instructions to create a Simple Object Access Protocol (SOAP) message with the appended URL in header information and the XML document in a body.

11. The non-transitory computer-readable medium of claim 7, wherein the notification is transmitted to an operator.

12. The non-transitory computer-readable medium of claim 11, wherein the operator causes the reflowing of the digital snapshot.

13. The non-transitory computer-readable medium of claim 7, wherein the one or more instructions that cause the device to produce the digital snapshot include:
one or more instructions, which when executed by the device, cause the device to:
produce the digital snapshot as the data transmission enters the stateless service bus of the device.

14. The non-transitory computer-readable medium of claim 7, wherein the one or more instructions that cause the device to reflow the digital snapshot include:
one or more instructions, which when executed by the device, cause the device to:
identify the digital snapshot to reflow based on the unique identifier.

15. A system, comprising:
a processor; and
a memory comprising computer-readable instructions which when executed by the processor, cause the processor to:
receive, from a computer application and by a stateless service bus, a data transmission intended for one or more recipient systems;
produce a digital snapshot of contents of the data transmission by the stateless service bus;
assign a unique identifier to the digital snapshot by the stateless service bus;
forward the digital snapshot along with the unique identifier to a service oriented architecture (SOA);
store the digital snapshot in a database keyed to the unique identifier by the SOA;
receive a notification of a failure of the data transmission to reach at least one of the one or more recipient systems,
the notification comprising a uniform resource locator (URL) corresponding to an address of the failure;
append the URL to the digital snapshot in the database;
reflow the digital snapshot with the appended URL to the stateless service bus for transmission to the at least one of the one or more recipient systems that failed to receive the data transmission.

16. The system of claim 15, wherein the data transmission comprises a Simple Object Access Protocol (SOAP) message.

17. The system of claim 15, wherein the digital snapshot is an eXtensible Markup Language (XML) document.

18. The system of claim 17, wherein, the processor, when reflowing the digital snapshot, is to:
create a Simple Object Access Protocol (SOAP) message with the appended URL in header information and the XML document in a body.

19. The system of claim 15, wherein the notification is transmitted to an operator.

20. The system of claim 19, wherein the operator causes the reflowing of the digital snapshot.

* * * * *